(12) United States Patent
Seeley et al.

(10) Patent No.: US 12,189,362 B2
(45) Date of Patent: Jan. 7, 2025

(54) METHOD FOR FABRICATING A COMPONENT OF AN ABATEMENT APPARATUS

(71) Applicant: Edwards Limited, Burgess Hill (GB)

(72) Inventors: Andrew James Seeley, Burgess Hill (GB); Gary Peter Knight, Clevedon (GB); Duncan Michael Price, Clevedon (GB); Mayank Verma, Burgess Hill (GB)

(73) Assignee: Edwards Limited, West (GB)

( * ) Notice: Subject to any disclaimer, the term of this patent is extended or adjusted under 35 U.S.C. 154(b) by 785 days.

(21) Appl. No.: 17/055,391

(22) PCT Filed: May 13, 2019

(86) PCT No.: PCT/GB2019/051305
§ 371 (c)(1),
(2) Date: Nov. 13, 2020

(87) PCT Pub. No.: WO2019/220087
PCT Pub. Date: Nov. 21, 2019

(65) Prior Publication Data
US 2021/0223755 A1    Jul. 22, 2021

(30) Foreign Application Priority Data
May 15, 2018    (GB) .................................... 1807855

(51) Int. Cl.
*G05B 19/4099*    (2006.01)
*B33Y 50/00*    (2015.01)
(Continued)

(52) U.S. Cl.
CPC .......... *G05B 19/4099* (2013.01); *B33Y 50/00* (2014.12); *F23D 14/18* (2013.01);
(Continued)

(58) Field of Classification Search
CPC ..... B33Y 50/00; G06F 30/23; G06F 2113/10; G06F 2119/18; G06T 17/20
See application file for complete search history.

(56) References Cited

U.S. PATENT DOCUMENTS

| 4,597,734 A | 7/1986 | McCausland et al. |
| 4,810,587 A | 3/1989 | Losfeld et al. |

(Continued)

FOREIGN PATENT DOCUMENTS

| CN | 104732015 A | 6/2015 |
| CN | 107917423 A | 4/2018 |

(Continued)

OTHER PUBLICATIONS

Roegiers, J., van Walsem, J., & Denys, S. (Apr. 15, 2018). CFD- and radiation field modeling of a gas phase photocatalytic multi-tube reactor. Chemical Engineering Journal, 338, 287-299. (Year: 2018).*

(Continued)

*Primary Examiner* — Bijan Mapar
(74) *Attorney, Agent, or Firm* — Theodore M. Magee; Westman, Champlin & Koehler, P.A.

(57) ABSTRACT

A method for fabricating a component of an abatement apparatus is disclosed. The method comprises: meshing a 3D model representation of a component defining a reaction chamber of an abatement apparatus based on specified component characteristics to define an optimised finite element representation of the component; and fabricating the optimised finite element representation. In this way, a 3D model of a component of an abatement apparatus can be generated from which its performance can be modelled. Particular characteristics of the component may be defined which affect the operation of the abatement apparatus. Those characteristics may then be used to generate the optimized finite element representation of the component which has those characteristics using meshing (it will be appreciated (Continued)

that meshing is the operation of representing a geometric object as a set of finite elements). The optimized finite element representation may then fabricated, reliably producing a component having the required characteristics.

21 Claims, 2 Drawing Sheets

(51) Int. Cl.
| | |
|---|---|
| *F23D 14/18* | (2006.01) |
| *G06F 30/00* | (2020.01) |
| *G06F 30/23* | (2020.01) |
| *G06F 119/18* | (2020.01) |
| *G06T 17/20* | (2006.01) |
| *F23G 7/06* | (2006.01) |
| *G06F 113/10* | (2020.01) |

(52) U.S. Cl.
CPC .............. *G06F 30/00* (2020.01); *G06F 30/23* (2020.01); *G06T 17/20* (2013.01); *F23G 7/061* (2013.01); *F23G 2209/142* (2013.01); *G05B 2219/35017* (2013.01); *G06F 2113/10* (2020.01); *G06F 2119/18* (2020.01)

(56) References Cited

U.S. PATENT DOCUMENTS

| | | | |
|---|---|---|---|
| 5,326,631 | A | 7/1994 | Carswell et al. |
| 5,510,093 | A | 4/1996 | Bartz et al. |
| 6,558,810 | B2 | 5/2003 | Garbo |
| 2005/0203725 | A1 | 9/2005 | Jenny et al. |
| 2007/0288210 | A1 | 12/2007 | Powell |
| 2009/0259329 | A1 | 10/2009 | Patnala |
| 2011/0262695 | A1 | 10/2011 | Lee et al. |
| 2016/0123583 | A1 | 5/2016 | Rakette et al. |
| 2017/0061037 | A1 | 3/2017 | Makem et al. |
| 2017/0116779 | A1 | 4/2017 | Lalish |
| 2019/0212007 | A1 | 7/2019 | Miyazaki et al. |

FOREIGN PATENT DOCUMENTS

| | | | | |
|---|---|---|---|---|
| DE | 102016112033 | A1 | * | 1/2018 |
| EP | 2784704 | A1 | | 10/2014 |
| EP | 3133344 | A1 | | 2/2017 |
| EP | 3246831 | A1 | | 11/2017 |
| EP | 3255611 | A1 | | 12/2017 |
| GB | 2532704 | A | | 6/2016 |
| GB | 2532776 | A | | 6/2016 |
| JP | H03216765 | A | | 9/1991 |
| JP | 2008000675 | A | | 1/2008 |
| JP | 2008102767 | A | | 5/2008 |
| JP | 2014191826 | A | | 10/2014 |
| JP | 2017215957 | A | | 12/2017 |
| JP | 2018031579 | A | * | 3/2018 ............. F23D 14/20 |
| WO | 2008060504 | A2 | | 5/2008 |
| WO | 2016151782 | A1 | | 9/2016 |

OTHER PUBLICATIONS

Frei, W. (Dec. 27, 2013). Using Adaptive Meshing for Local Solution Improvement. COMSOL Blog, retrieved from https://www.comsol.com/blogs/using-adaptive-meshing-local-solution-improvement/ (Year: 2013).*
British Examination Report dated Oct. 31, 2018 and Search Report dated Oct. 30, 2018 for corresponding British Application No. GB1807855.0.
PCT Notification of Transmittal of the International Search Report and the Written Opinion of the International Searching Authority, or the Declaration dated Jul. 12, 2019, PCT Search Report and Written Opinion dated Jul. 12, 2019 for corresponding PCT Application No. PCT/GB2019/051305.
Laramee, FIRST: a flexible interactive resampling tool for CFD simulation data; Computers & Graphics, vol. 27, No. 6, p. 905-916, 2003.
First Office Action Sep. 2, 2022 from Chinese application Serial No. 201980032426.6, 12 pages.
Search Report dated Aug. 29, 2022 from Chinese application Serial No. 201980032426.6, 2 pages.
Notice of Reasons for Refusal dated Aug. 25, 2022 from Japanese application Serial No. 2020/564434, 7 pages.
Notice of Reasons for Refusal dated Aug. 29, 2022 from Japanese application Serial No. 2020/564434, 3 pages.
Japanese Decision for Final Rejected dated Apr. 6, 2023 for corresponding Japanese application Serial No. JP2020-564434, 6 pages.
Roegiers et al., CFD- and radiation field modeling of a gas phase photocatalytic multi-tube reactor, Chemical Engineering Journal, vol. 338, pp. 287-299, 2018.
Christiansen et al., Automatic balancing of 3D models, Computer-Aided Design, vol. 58, pp. 236-241, 2015.

* cited by examiner

METHOD FOR FABRICATING A COMPONENT OF AN ABATEMENT APPARATUS

CROSS-REFERENCE OF RELATED APPLICATION

This application is a Section 371 National Stage Application of International Application No. PCT/GB2019/051305, filed May 13, 2019, and published as WO 2019/220087 A1 on Nov. 21, 2019, the content of which is hereby incorporated by reference in its entirety and which claims priority of British Application No. 1807855.0, filed May 15, 2018.

FIELD

The present invention relates to a method for fabricating a component of an abatement apparatus.

BACKGROUND

Abatement apparatus for performing abatement are known and are typically used for treating an effluent gas stream from a manufacturing processing tool used in, for example, the semiconductor or flat panel display manufacturing industry. During such manufacturing, residual perfluorinated compounds (PFCs) and other compounds exist in the effluent gas stream pumped from the process tool. PFCs are difficult to remove from the effluent gas and their release into the environment is undesirable because they are known to have relatively high greenhouse activity.

Known abatement apparatus use heat to remove the PFCs and other compounds from the effluent gas stream. Typically, the effluent gas stream is a nitrogen stream containing PFCs and other compounds. Induction heaters, plasma or combustion is used to generate heat to treat the effluent stream. For example, in a combustion arrangement, a fuel gas is mixed with the effluent gas stream and that gas stream mixture is conveyed into a combustion chamber that is laterally surrounded by the exit surface of a foraminous gas burner. Fuel gas and air are simultaneously supplied to the foraminous burner to affect flameless combustion at the exit surface, with the amount of air passing through the foraminous burner seeking to be sufficient to consume not only the fuel gas supply to the burner, but also all the combustibles in the gas stream mixture injected into the combustion chamber.

Although abatement apparatus help treat the effluent stream, fabricating the abatement apparatus can be problematic. Accordingly, it is desired to provide an improved technique for fabricating abatement apparatus.

The discussion above is merely provided for general background information and is not intended to be used as an aid in determining the scope of the claimed subject matter. The claimed subject matter is not limited to implementations that solve any or all disadvantages noted in the background.

SUMMARY

According to a first aspect, there is provided a method, comprising: meshing a 3D model representation of a component defining a reaction chamber of an abatement apparatus based on specified component characteristics to define an optimised finite element representation of the component; and fabricating the optimised finite element representation.

The first aspect recognises that a problem with existing techniques for fabricating components of an abatement apparatus is that they are complicated and the operation of the abatement apparatus is difficult to define. Accordingly, a method is provided. The method may be for fabricating an abatement apparatus or component thereof. The method may comprise the step of meshing a three-dimensional (3D) model representation or definition of the component; the 3D model defining at least a reaction chamber of the abatement apparatus. The meshing may be based on, or performed in response to, specified or defined characteristics of the component. The meshing may define or create an optimized finite element or cellular representation of the component, based on the specified component characteristics. That is to say, the meshing of the 3D model representation may not only create a finite element representation of the component, but the finite element representation itself may be optimized based on the characteristics required of that component. The method may comprise the step of fabricating the component from the optimized finite element representation. In this way, a 3D model of a component of an abatement apparatus can be generated from which its performance can be modelled. Particular characteristics of the component may be defined which affect the operation of the abatement apparatus. Those characteristics may then be used to generate the optimized finite element representation of the component which has those characteristics using meshing (it will be appreciated that meshing is the operation of representing a geometric object as a set of finite elements). The optimized finite element representation may then fabricated, reliably producing a component having the required characteristics.

In one embodiment, the meshing comprises meshing with at least one finite element. Accordingly, the 3D model representation may be meshed with one or more finite elements.

In one embodiment, the meshing comprises meshing with a plurality of finite elements. Accordingly, the 3D model representation may be meshed with more than one finite element.

In one embodiment, the meshing comprises fitting the finite elements to fill the 3D model representation. Accordingly, the finite elements may be fitted to fill, map onto or cover the 3D model representation.

In one embodiment, the fitting comprises fitting the finite elements to fill the 3D model representation based on terminal constraints. Accordingly, the finite elements may be fitted to fill, map onto or cover the 3D model representation subject to constraints on how well they fit.

In one embodiment, the terminal constraints comprise preventing protrusion of the finite elements beyond a surface of the 3D model representation. Accordingly, the terminal constraints may prevent the protrusion or extension of the finite elements beyond or past a surface or boundary of the 3D model representation.

In one embodiment, the method comprises selecting combinations of the finite elements to prevent protrusion of the finite elements beyond a surface of the 3D model representation. Accordingly, different combinations of finite elements may be selected which prevent the protrusion or extension of finite elements beyond a surface or boundary of the model representation.

In one embodiment, the method comprises truncating the finite elements to prevent protrusion of the finite elements beyond a surface of the 3D model representation. Accordingly, the finite elements may be truncated, cut or subdivided to prevent their protrusion or extension beyond a surface or boundary of the 3D model representation.

In one embodiment, each finite element is regular.

In one embodiment, each finite element is a polyhedron.

In one embodiment, each finite element comprises faces joined by edges.

In one embodiment, the faces are one of open and at least partially filled. Hence, the faces may be unfilled, filled or be partly filled.

In one embodiment, the edges provide a scaffold defining the finite element. Accordingly, the edges may provide or define a scaffold or skeleton which forms the finite element.

In one embodiment, at least one of the faces and the edges are one of planar and curved.

In one embodiment, the 3D model representation defines surfaces of the component.

In one embodiment, the 3D model representation defines external surfaces of the component.

In one embodiment, the meshing comprises adjusting filling of the finite elements based on the specified component characteristics. Accordingly, the amount or degree to which the finite elements are filled is adjusted or selected, based on or in response to the specified component characteristics.

In one embodiment, the meshing comprises adjusting filling of the finite elements to adjust fluid communication between the finite elements. Accordingly, the amount or degree to which the finite elements are filled can be varied or selected to control the amount of fluid communication between finite elements. It will be appreciated that a finite element completely filled provides for no fluid communication, whereas a finite element partially filled or completely unfilled allows for fluid communication.

In one embodiment, the adjusting filling comprises at least partially filling faces of finite elements.

In one embodiment, the adjusting filling comprises at least partially filling a void defined by finite elements.

In one embodiment, the adjusting filling comprises varying a thickness or aspect ratio of edges of finite elements.

In one embodiment, the specified component characteristics define a permeability and the meshing comprises adjusting filling of finite elements to provide the permeability.

In one embodiment, the specified component characteristics define a permeability in each of a plurality of regions of the component and the meshing comprises adjusting filling of finite elements in each of the plurality of regions of the component to provide the permeability in that region. Accordingly, different regions, portions, areas or volumes of the component may be allocated different permeabilities and the filling of finite elements within those regions may be adjusted or selected in those regions to allow or restrict fluid flow and provide those permeabilities.

In one embodiment, the permeability comprises a receiving permeability. Hence, the permeability may be the rate at which flow occurs into the component.

In one embodiment, the permeability comprises an internal permeability. Hence, the permeability may be the rate at which flow occurs within the component.

In one embodiment, the permeability comprises an emitting permeability. Hence, the permeability may be the rate at which flow occurs out of the component.

In one embodiment, the adjusting filling comprises at least partially filling a void defined by finite elements to provide the permeability.

In one embodiment, the adjusting filling comprises varying a thickness of edges of finite elements to provide the permeability.

In one embodiment, the specified component characteristics define a porosity and the meshing comprises adjusting filling of the finite elements to provide the porosity.

In one embodiment, the specified component characteristics define a porosity in each of a plurality of regions of the component and the meshing comprises adjusting filling of the finite elements in each of the plurality of regions of the component to provide the porosity in that region. Accordingly, different regions, portions, areas or volumes of the component may be allocated different porosities and the filling of finite elements within those regions may be adjusted or selected in those regions to allow or restrict fluid flow and provide those porosities.

In one embodiment, the adjusting filling comprises filling faces of finite elements to provide the porosity.

In one embodiment, the specified component characteristics define a fluid flow through the component and the meshing comprises adjusting filling of the finite elements to provide the fluid flow.

In one embodiment, the specified component characteristics define a fluid flow from the component and the meshing comprises adjusting filling of the finite elements to provide the fluid flow.

In one embodiment, fluid flow comprises at least one of a laminar fluid flow and a turbulent fluid flow.

In one embodiment, the specified component characteristics define a fluid flow in each of a plurality of regions of the component and the meshing comprises adjusting filling of the finite elements in each of the plurality of regions of the component to provide the fluid flow in that region. Accordingly, different regions, portions, areas or volumes of the component may be allocated different fluid flows and the filling of finite elements within those regions may be adjusted or selected in those regions to provide those fluid flows.

In one embodiment, the specified component characteristics define a structural body and the meshing comprises adjusting filling of the finite elements to provide the structural body. Accordingly, finite elements may be filled in order to define a structural body within the component.

In one embodiment, the structural body comprises a sealing surface for sealing the component within the abatement apparatus.

In one embodiment, the specified component characteristics define a member and the meshing comprises adjusting a configuration of filling of the finite elements to provide the member. Hence, finite elements may be filed so that together they form a member or element.

In one embodiment, the member comprises at least one of a structural and thermal member.

In one embodiment, the thermal member is configured to control heat conductivity of the component.

In one embodiment, the structural member is configured to provide mechanical stiffening to the component.

In one embodiment, the specified component characteristics define materials at locations of the component and the meshing comprises specifying finite elements made from the materials to provide the optimised cellular structure.

In one embodiment, the materials are located to support catalytic reactions.

In one embodiment, the 3D model representation defines the component having at least one of a cylindrical, bell or thimble and polyhedron shape.

In one embodiment, the 3D model representation defines the component having walls of one of constant and varied thickness.

In one embodiment, the fabricating comprises additive manufacturing.

In one embodiment, the meshing comprises meshing the 3D model representation of the component to define a finite element representation of the sleeve and optimising the cellular element representation of the component based on the specified component characteristics to provide the optimised cellular element representation.

According to a second aspect, there is provided a component defining a reaction chamber of an abatement apparatus formed by the method of the first aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DETAILED DESCRIPTION

Before discussing the embodiments in any more detail, first an overview will be provided. Embodiments provide a technique for reliably producing a component of an abatement apparatus having predefined operating characteristics. A 3D model of the component is generated and characteristics of that component (such as properties of fluid flow into, out and/or through the component, structural, thermal, chemical and/or physical requirements of the component, and the like) are defined. These characteristics are used when meshing the 3D model to provide finite element representation of the component which incorporates those characteristics. In other words, when creating the finite element representation of the component, characteristics of the component can be specified in order to influence the extent to which each finite element is filled and by what. For example, the porosity of a surface of a region of the component can be controlled by controlling the number of filled faces of the finite elements making up that surface and/or by varying the thickness of the edges joining vertices of those faces. Likewise, the permeability of a region of the component can be controlled by varying the degree to which finite elements in that region are filled. Again, such filling can be achieved by varying the thickness of the edges joining vertices of the finite elements. Whole structural members can be formed by filling finite elements to define that structural member, such as a ceiling face, a rib or a flange and the like. It is possible to vary physical or chemical properties of different regions of the component by controlling the material used to fabricate the component. For example, highly conductive materials may be used in some regions and highly insulating materials in others. Likewise, mechanically strong materials may be used in some regions and less strong materials in others. This finite element representation can then be fabricated in order to produce the component.

The component is typically constructed from the finite element representation using additive manufacturing as the finite element representation provides modular building-blocks which are well-suited to such additive manufacturing techniques.

Figure 1:
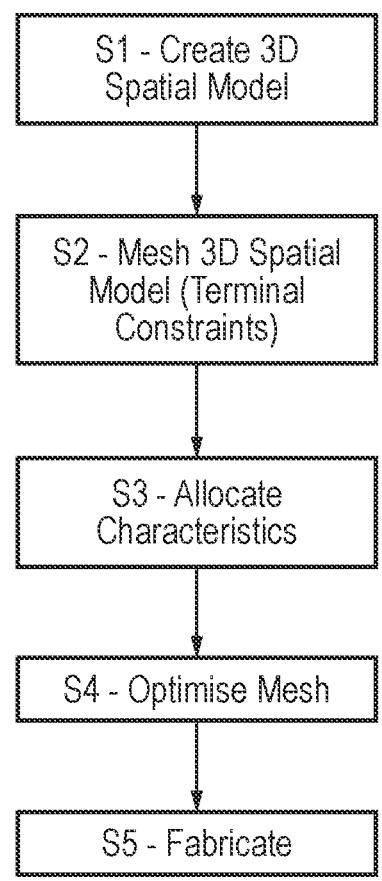
FIG. 1 is a flow chart showing the main steps of one embodiment.

FIG. 1 is a flow chart showing the main steps of one embodiment. As will be apparent, although the steps are shown for ease of description as being sequential, many of the steps may be performed iteratively or in parallel, depending on the implementation used. The processing steps are typically performed by a computer (not shown) programmed to perform those steps. The fabrication is typically performed by an additive manufacturing apparatus (not shown) operating under the control of a computer (not shown).

3D Model Creation

Figure 2:
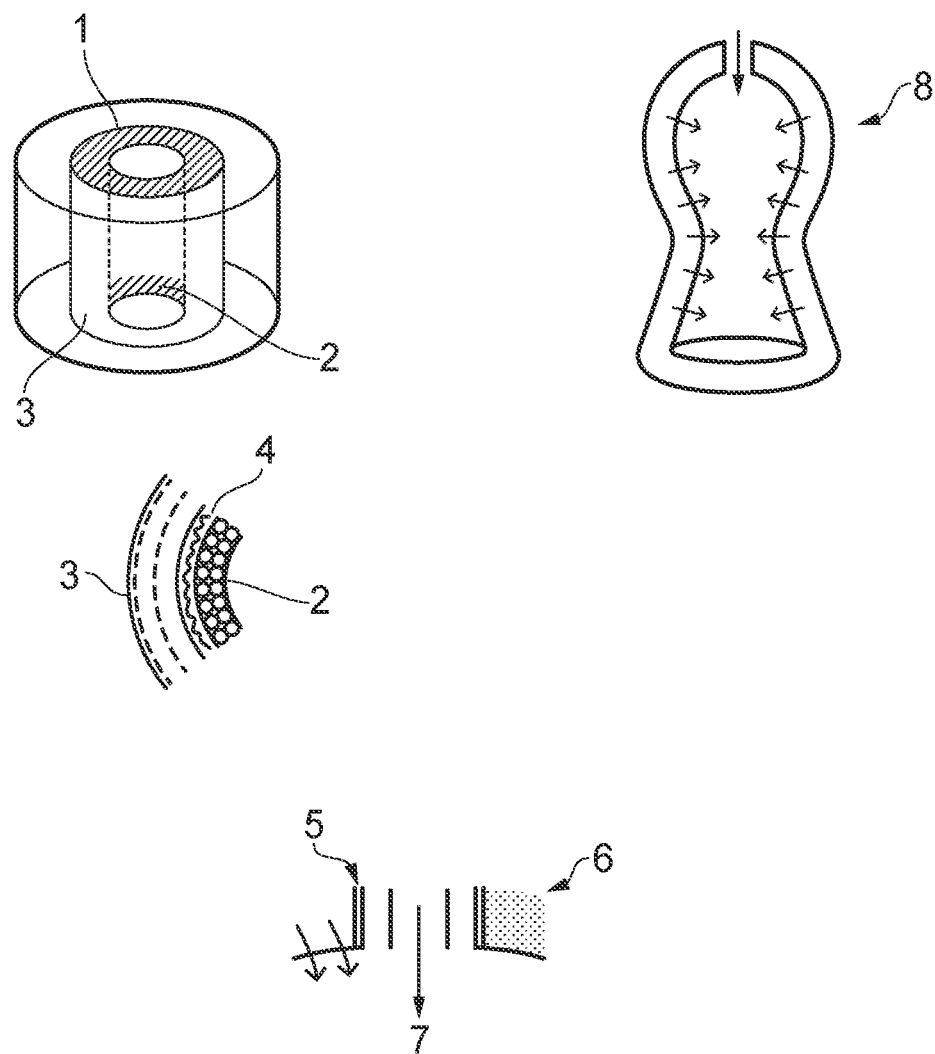
FIGS. 2A and 2B are schematics illustrating features of components according to embodiments.

At step S1, a 3D spatial model of a component of an abatement apparatus is created using a model processor running on the computer. It will be appreciated that a variety of different modelling techniques, representations or formats may be used to represent the component in 3D space. For example, surfaces, edges, vertices and/or points defining the shape of the component may be specified in the 3D spatial model. Schematic illustrations of illustrating such models are shown in FIGS. 2A and 2B. In FIG. 2A, (1) illustrates non-porous sealing surfaces/edges; (2) illustrates a smooth inner surface; (3) illustrates an outer surface with selective porosity; (4) illustrates a compositional gradient with catalytic material buried in the structure and selective "binding" to minimise radiative heat transfer; (5) illustrates a solid; (6) illustrates a porous material; and (7) indicates a nozzle. FIG. 2B is bell-shaped and (8) indicates a graded porosity. The models may be of a part of an abatement apparatus such as a sleeve for a reaction chamber. The models may also be of a larger part which would normally be formed from separate components such as a combined reaction chamber and head assembly.

Meshing

At step S2, the 3D spatial model is meshed by a meshing processor using one or more different finite elements or cellular structures. Again, it will be appreciated that a variety of different techniques may be used to perform such meshing. The cellular structures are typically formed from polyhedrons having polygons joined at their edges. When meshing, more than one type of polyhedron may be used. Furthermore, the size of the polyhedrons used may be varied as required. The cellular structures may be selected based on those best-suited to the additive manufacturing technique to be used to fabricate the component.

When meshing, terminal constraints may be defined which may specify that the cellular structures are not permitted to extend beyond a surface or boundary of the 3D spatial model. In order to achieve this, the meshing processor may select combinations of different cellular structures and/or vary their size to achieve this. In some circumstances, the meshing processor may truncate or sub-divide the cellular structures to achieve those terminal constraints.

Once the meshing processor has filled the 3D spatial model with cellular structures then processing proceeds to step S3.

Characteristic Allocation

At step S3, characteristics for all or, more typically, a part of the component are allocated. For example, a porosity in a particular region may be defined or a porosity gradient across a region may be defined. Similarly, a permeability through a region or a permeability gradient through a region may be defined. Likewise, mechanical strength or thermal conductivity of regions may be defined. In some situations, the chemical properties or materials in a particular may be defined.

With these characteristics, the meshing processor determines the material required for each cellular structure, together with how that cellular structure is to be filled. For example, should low porosity be required in a region, then the cellular structures in that region can be filled and/or have the faces forming a surface of the component filled and/or have a greater thickness of the edges defining those cellular structures to reduce porosity in that region. Conversely, should higher porosity be required, then the cellular structures in that region can be unfilled and/or have the faces forming a surface of the component unfilled and/or have a reduced thickness of the edges defining those cellular structures to increase porosity in that region. A similar approach can be used for cellular structures within the body of the component to adjust permeability through the region of that body. Likewise, the thermal properties can be adjusted by selective filling of faces (or blinding) to adjust radiative heat transfer.

These techniques can be used to create solid structures within the component to provide, for example, sealing surfaces or edges, strengthening struts, connecting flanges, screw-threads, through-bores or other mechanical structures, as well as providing structures to provide the correct thermal properties or thermal paths for the component.

Where more than one material is available for forming the cellular structures, these materials may also be specified by the meshing processor to achieve those characteristics. Likewise, different materials may be specified to provide the correct chemical properties at different locations in the component.

At step S4, an optimized mesh is defined. Each cellular element in the optimized mesh is specified as being filled or not and, if filled, the extent of filling. Where different materials can be specified, each cellular element in the optimized defined to be formed from a specified material.

At step S5, the component is fabricated using an additive manufacturing technique such as, for example, 3D printing.

Embodiments provide a printed cylinder burner structure with controlled porosity and geometry such that the exit surface is smooth, the burner is robust, cleanable, washable and suitable for gas flow (methane/propane etc.). On the back side (where gas enters) there is a cellular structure which can be designed/tailored to give the desired gas flow. An inner blinded surface can be also included to control thermal conductivity and heat loss by radiation. A further design addition is to have solid areas (typically rings at the top and bottom/sealing surfaces) which can insert and seal directly to the plenum. With these design considerations the overall geometry of the structure can be changed whereby we can we have a bell shaped profile (like a rocket burner), or square or trapezoid shaped. Geometric features can be added to control the flow of gas i.e. make it turbulent or laminar where required. Another feature of the burner is to have a graded composition (material) whereby this can be used to control catalytic properties i.e. noble metals in the middle of the burner thickness or surface, for thermal and chemical reasons (ceramic or outside to metal on inside).

Embodiments provide features i.e. multi-functional layers, interface with plenum, which are not possible to make conventionally as they can't be cast or made from sheets. A key advantage is that the structure/geometry/composition (material density, lattice) and flow paths can be controlled. This means that burner nozzles can be placed where we please and the design iterated without cost implication/difficulty to have to re-cast/manufacture conventionally. In embodiments, algorithms are used for foam or cellular geometry/lattice structure. The designs can be customised for different applications i.e. output volumes, gas loading, etc based on requirements.

Embodiments provide tailored overall shape/geometry, custom size depending on application, multi-layer configuration, lattice/foam structure variations, outer skin porosity (geometrical shapes e.g. circular, triangular, hex mesh spacing grid positioning). The materials used—metallic, ceramic, polymer alloys—could all be varied. Nozzle configuration, positions and quantity can be varied. Internal features to shroud nozzles, direct flow and facilitate turbulent and laminar flow can be provided where required. Internal channels can be incorporated to extract/manage heat. Stiffening structure/ribs can be incorporated to give strength where required.

Embodiment provide a technique for 3D printing components of an abatement apparatus such as burner liners and induction heat susceptors. The technique can be used to produce a porous gas control element for use either as a foraminous burner or a susceptor for an induction heated abatement system.

The technique comprises: 1) Modelling the solid shape in a 3D computer aided design (CAD) environment, e.g. Catia; 2) Exporting the shape in a transferable format e.g. STEP file; 3) Importing into a meshing package that creates a reticulated foam replica of the solid shape; 4) Exporting the foam shape in a transferable format e.g. STEP file for 3D printing.

The meshing package would typically accept "high-level" parameters such as fibre thickness, porosity, pores per inch to create the basic structure. The mesh scheme (cubic, tetrahedral etc.) is selectable or one type favoured/optimised. The downstream termination would typically be continuous, i.e. not having dangling ends. Fully occluded areas of the upstream face would typically be defined as mounting surfaces for fitting into fixtures. Partial occlusion of the upstream face, by closing selected cell faces would typically be used to control the flow and hence firing rate of parts of the burner. Different zones may be defined as having different porosity.

Materials of interest for printing: Fe—Cr-Al-Y "fecralloy", 314 Stainless Steel would be basic materials for burners. Higher-temperature materials such as 0Cr27Al7Mo2 or "ferromolybdenum" for induction heating.

In embodiments, the porous shape is loaded into a computational fluid dynamics (CFD) package, for example Star CCM+ and then to "mesh the mesh" in order to model the flow characteristics of the porous material. This would be particularly suited to understanding how the flow develops downstream of a selectively-occluded face. Likewise, modelling the back-face temperature under "real conditions" in a burner could be useful. Together, these pieces of information allow optimisation of the thickness of the porous layer, ultimately economising on material.

Embodiments provide a burner liner having one or more of: A smooth downstream surface; No dangling fibre ends; Robust, cleanable, washable; Suitable for a surface-firing rate range with residual oxygen; Back-face selectively-blinded to give controlled flow-rate/surface firing rate, also jointing or sealing surfaces top and bottom (for a cylindrical burner); Refinements to flow channels to produce a bell-mouth; Controlled back-face temperature through conductivity/opacity control; selective blinding in a regular pattern through the structure so as to achieve line-of-sight optical-blindness, thereby minimising radiative heat transfer.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A method, comprising:
   meshing a 3D model representation of a component defining a reaction chamber of an abatement apparatus so as to produce a porous shape consisting of a mesh with selected faces closed so as to provide porosity and line-of-sight optical blindness;
   meshing the porous shape consisting of a mesh with selected faces closed to produce a secondary mesh;
   using the secondary mesh to determine flow characteristics of the porous shape;
   determining that the flow characteristics of the secondary mesh satisfy specified component characteristics and in response,
   fabricating said porous shape.

2. The method of claim 1, wherein meshing the 3D model representation comprises meshing with at least one finite element.

3. The method of claim 1, wherein meshing the 3D model representation comprises fitting said finite elements to fill said 3D model representation.

4. The method of claim 3, wherein said fitting comprises fitting said finite elements to fill said 3D model representation based on terminal constraints.

5. The method of claim 4, wherein said terminal constraints comprise preventing protrusion of said finite elements beyond a surface of said 3D model representation.

6. The method of claim 5, comprising selecting combinations of said finite elements to prevent protrusion of said finite elements beyond a surface of said 3D model representation.

7. The method of claim 5, comprising truncating said finite elements to prevent protrusion of said finite elements beyond a surface of said 3D model representation.

8. The method of claim 1, wherein meshing the 3D model representation further comprises at least partially filling a void defined by finite elements.

9. The method of claim 1, wherein meshing the 3D model representation further comprises
   varying a thickness of edges of finite elements in the mesh.

10. The method of claim 9, wherein said specified component characteristics define a permeability.

11. The method of claim 10, wherein meshing the 3D model representation further comprises at least partially filling a void defined by finite elements in the mesh.

12. The method of claim 1, wherein said specified component characteristics define a porosity.

13. The method of claim 1, wherein said specified component characteristics define a fluid flow through said porous shape.

14. The method of claim 1, wherein said specified component characteristics define a fluid flow from said porous shape and the meshing of the 3D model representation further comprises adjusting filling of finite elements in the mesh.

15. The method of claim 1, wherein said specified component characteristics define a structural body.

16. The method of claim 1, wherein said specified component characteristics define a member.

17. The method of claim 1, wherein said specified component characteristics define materials at locations of said porous shape and meshing the 3D model representation comprises specifying finite elements made from said materials.

18. The method of claim 17, wherein said materials are located to support catalytic reactions.

19. The method of claim 1, wherein said 3D model representation defines said component having at least one of a cylindrical, bell and polyhedron shape.

20. The method of claim 1, wherein said 3D model representation defines said component having walls of one of constant and varied thickness.

21. The method of claim 1, wherein said fabricating comprises additive manufacturing.

* * * * *